United States Patent [19]

Kachi et al.

[11] Patent Number: 4,810,863
[45] Date of Patent: Mar. 7, 1989

[54] READ/WRITE APPARATUS FOR INFORMATION MEMORY CARD

[75] Inventors: Kenjiro Kachi; Tetsuya Honda, both of Saitama, Japan

[73] Assignee: Kabushikikaisha Nipponcoinco, Tokyo, Japan

[21] Appl. No.: 077,413

[22] Filed: Jul. 24, 1987

[51] Int. Cl.⁴ ............................................. G06K 7/06
[52] U.S. Cl. .................................. 235/441; 235/479; 235/482; 235/486
[58] Field of Search ............... 235/441, 479, 480, 486, 235/482

[56] References Cited

U.S. PATENT DOCUMENTS 4,404,464  9/1983  Moreno .......................... 235/441 X
4,724,310  2/1988  Shimamura et al. ................. 235/483

FOREIGN PATENT DOCUMENTS 2492213  4/1982  France ................................. 235/441

Primary Examiner—David L. Trafton
Attorney, Agent, or Firm—Koda and Androlia

[57] ABSTRACT

A read/write apparatus for information memory card which is improved in durability of the card and the apparatus itself, and in reliability of information processing.

When a card is completely inserted, a connector is swung toward the card until contactors of the connector are pressed on terminals of a memory built in the card, so that the memory and an information processing unit are connected via the connector to facilitate flawless information exchange therebetween, whereby data processing is ensured.

Upon completion of information processing, the connector is detached from the card so that the movement of the card causes no wear or damage on the contactors nor the card itself.

11 Claims, 16 Drawing Sheets

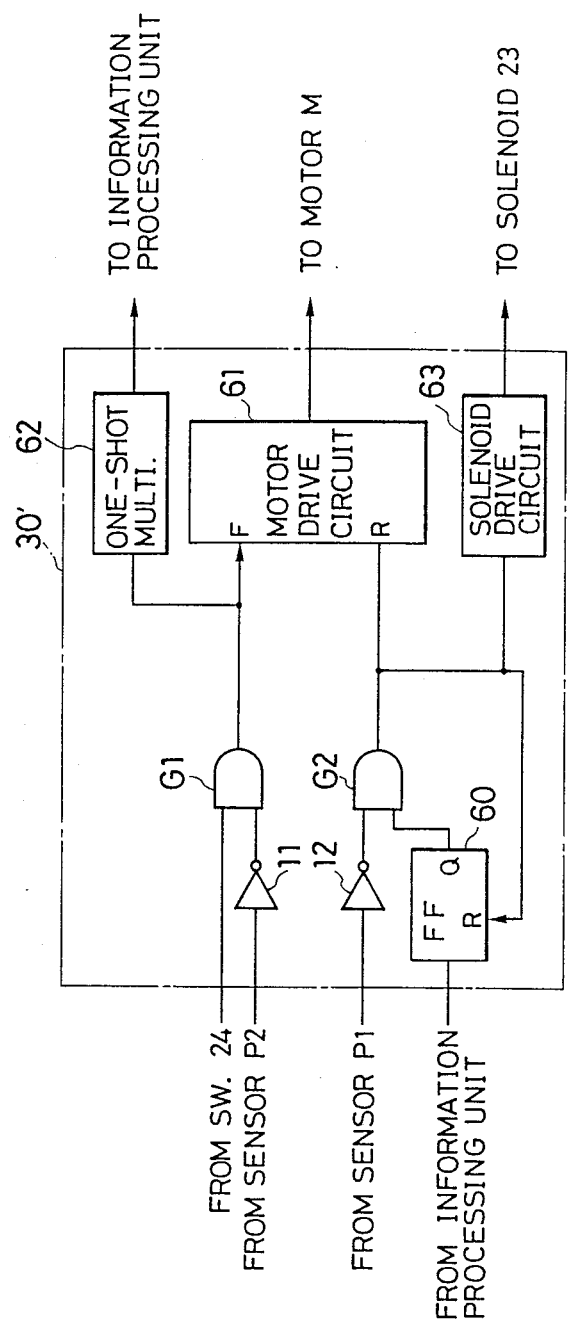

READ/WRITE APPARATUS FOR INFORMATION MEMORY CARD

BACKGROUND OF THE INVENTION

This invention relates to a read/write apparatus adapted to read information out from and write same on information memory cards such as a magnetic card and an IC card, which are popularly used as information carrying cards, e.g. bank cards, various credit cards, cards for controlling various equipments, patient's chart cards, identification cards.

Among the information memory cards, the more widely used ones are a magnetic card with a magnetic stripe formed lengthwise and an IC card with an IC memory built therein. A read/write apparatus for magnetic card is designed to read information out from and write same on the magnetic stripe of the card by means of its magnetic head, which is positioned such that its sensory face meets the magnetic stripe as the card is conveyed in the apparatus. A read/write apparatus for IC card, on the other hand, is designed to read information out from and write same on the IC memory built in the card in such a manner that, with the card placed motionless in the apparatus, a connection occurs between the memory and the read/write apparatus as contactors of a connector of the apparatus are pressed on terminals of the memory formed in the surface of the card, and through this connection the information is read and written.

A conventional read/write apparatus for IC card is arranged such that when an IC card is inserted into the apparatus through an insertion slit to a certain depth, the card is automatically locked by a latch lever and data processing (reading and writing of data) is applied to the locked card; after the completion of the data processing, the latch lever is caused, manually (push the card a little deeper) or by energizing a solenoid, to unlock the card and displace the card until a substantial part of the card sticks out from the insertion slit. Another conventional read/write apparatus which has a card conveyor mechanism annexed to the card insertion slit is arranged such that a card placed on the conveyor is carried past the insertion slit to a certain position in the apparatus where data processing is applied to the stationary card; after the completion of the data processing the card conveyor mechanism operates in the reverse manner to return the card past the insertion slit.

In either of the above two conventional read/write apparatuses for IC card, unless the contactors are properly connected to the memory terminals of the IC card, the application of the data processing to the IC card would be inaccurate; for this reason the contactors are disposed to be pressed against the card with a considerable force even when the card is being inserted and yet on its way to the lock position. As a result, the friction between the contactors and the card is so great that their wear caused thereby shortens the serviceable lives of the read/write apparatus itself as well as the IC card.

Another problem is that as the card is inserted, it forces aside the contactors, and the contactors thus shoved will sooner or later be bent permanently or broken to thereby lose their resilience and thus their ability to connect themselves to the memory terminals, which results in erroneous data processing. Such breakage or bending of the contactors is more liable to occur in the case of the apparatus with the card conveyor mechanism, where the card is mechanically conveyed into the apparatus without that tenderness which is practiced by a man when he inserts the card with his hand.

A read/write apparatus for both IC card and magnetic card has a problem: contactors of the connector are located where they can contact the memory terminals of the inserted IC card, but the location of the contactors may happen to be such that the contactors contact the magnetic stripe of the magnetic card as well, whereby the magnetic stripe may be damaged.

SUMMARY OF THE INVENTION

An object of the invention is to provide a read/write apparatus for information memory card wherein little friction occurs between the information memory card and the contactors of the connector when the card is conveyed into the apparatus or discharged therefrom, to thereby prevent the card and the contactors from wearing and especially the latter from breaking, and at the same time a positive connection is established between the memory terminals of the card and the contactors of the connector while data processing is carried on, whereby the serviceable lives of the card and the read/write apparatus become longer and the data processing becomes more accurate.

Another object of the invention is to provide a read/write apparatus for information memory card wherein the information memory card is reciprocated with its memory terminals in contact with the contactors of connector so that the memory terminals are dusted, and thereby the electrical connection between the memory terminals and the contactors becomes more positive, whereby erroneous data processing is prevented.

Still another object of the invention is to provide a read/write apparatus for information memory card wherein the IC card conveyed in the apparatus is prevented from wearing or breaking the contactors as well as itself, and at the same time a positive connection is established between the memory terminals of the card and the contactors of the connector while data processing is carried on, and also the contactors are disposed to cause little wear in the magnetic stripe of the magnetic card when the card is conveyed, whereby, whether IC card or magnetic card is used, the serviceable lives of the cards and the read/write apparatus become longer and the data processing becomes more accurate.

According to a first aspect of the invention, there is proposed a read/write apparatus for information memory card of the type in which an IC card—incorporating a memory—is manually inserted in the apparatus. When the IC card has been completely inserted in the read/write apparatus, an insertion completion detection means generates a detection signal, and at the same time a hold means holds the IC card in an insertion completion position. In response to the detection signal, the control means makes the connector drive means drive the connector means such that contactors of the connector means are brought in contact with respective terminals of the memory, which are at least partly exposed from the surface of the IC card. Thereafter, in response to a predetermined signal, e.g., an information processing completion signal from an information processing unit, the control means makes the connector drive means drive the connector means so as to bring the contactors out of contact with respective terminals of the memory, and makes a hold means inoperative to thereby return the IC card outwardly.

According to a second aspect of the invention, there is proposed a read/write apparatus for information memory card of the type in which an IC card is automatically conveyed in and out of the apparatus. In response to a detection signal generated by an insertion completion detection means upon completion of insertion of the IC card conveyed by the card conveyance means, a control means makes the card conveyance means stop conveying the card, and makes the connector drive means drive the connector means so as to bring the contactors in contact with respective terminals of the memory. Thereafter, in response to a particular signal, the control means makes the connector drive means drive the connector means so as to bring the contactors out of contact with respective terminals of the memory, and then makes the card conveyance means convey the IC card outwardly.

Preferably, the control means makes the card conveyance means reciprocate the IC card for a predetermined number of times with the contactors of the connector means are pressed on the memory terminals of the IC card.

Preferably, the read/write apparatus further comprises a magnetic head which faces a card passsage; while the magnetic card is conveyed, information stored in a magnetic stripe formed in the magnetic card is read out or another information is written on the magnetic stripe by means of the magnetic head. Consequently, the read/write apparatus is capable of accepting both an IC card and a magnetic card.

BRIEF DESCRIPTION OF THE DRAWINGS

FIG. 11 is a schematic diagram illustrating the circuit in the control center which is used in the modified version of the apparatus of the first embodiment;

DETAILED DESCRIPTION

Figure 1:
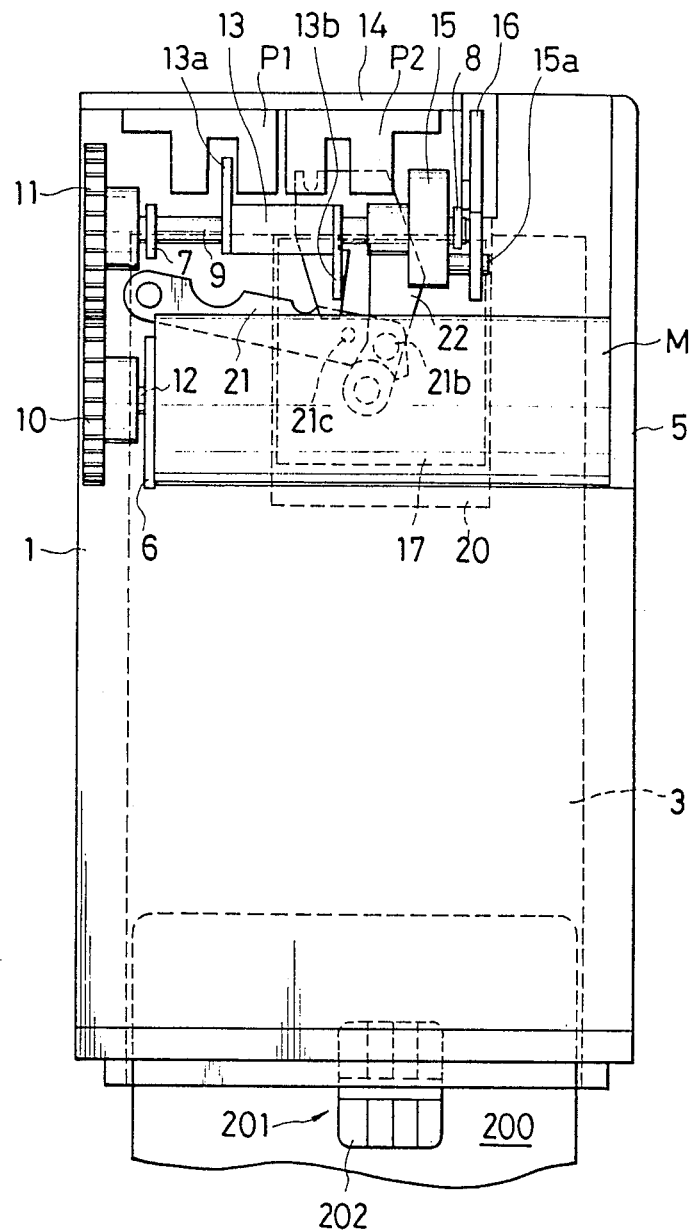
FIG. 1 is a schematic rear view of the main body of the read/write apparatus for information memory card, according to the first embodiment of the invention.

The invention will now be described in detail with reference to the drawings showing embodiments thereof.

FIGS. 1 through 4 show the main body of a read/write apparatus for IC card of a first embodiment of the invention. This apparatus is of the kind wherein an IC card (hereinafter called "the card") 200 is manually inserted.

A card passage 3 is formed between base plates 1 and 2, and arranged to be communicated with a card insertion slit 4 made at the front side of the main body of the apparatus. A motor M is fixed to support plates 5 and 6 which are slitted and formed perpendicularly to the base plate 1 at the rear side of the main body. A shaft 9 is rotatably supported at its ends by support plates 7 and 8. Mutually meshing gears 10 and 11 are locked around the output shaft 12 of the motor M and the shaft 9, respectively.

A sensor means 13 is provided integrally on the shaft 9, and has at its ends two wings 13a and 13b including an angle of about 90° therebetween around the axis of the shaft 9. Sensors P1 and P2 (e.g. photocells) attached to a support plate 14 are adapted to detect the approach of the wings 13a and 13b, respectively, whereby it is detected whether or not the shaft 9 has rotated through a predetermined amount of angle. A pin cam 15 having a pin 15a planted therein is locked around the shaft 9. The pin 15a is slidablly caught in a slit 16a formed in a connector lever 16, which 16 extends in a direction substantially perpendicular to the base plates 1 and 2, and is pivoted on a pin 18 to swing thereabout. Attached to one end of the connector lever 16 is a connector 17, which has contactors 19 provided on its free side.

Figure 2:
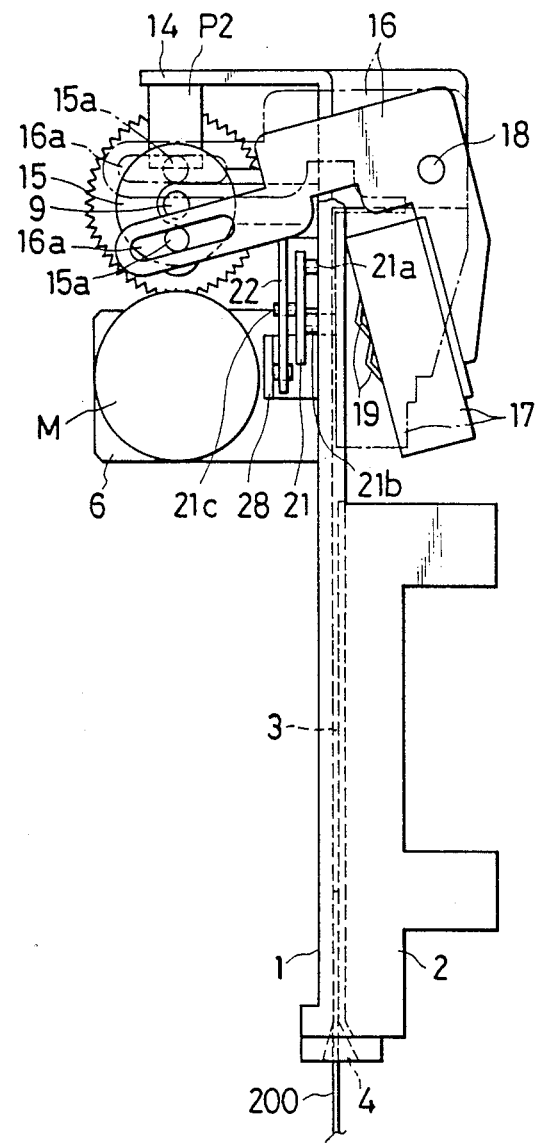
FIG. 2 is a schematic side view of the main body of the apparatus shown in FIG. 1.

The connector 17 is arranged such that, as the connector lever 16 swings clockwise, as viewed in FIG. 2, the connector 17 partly enters a bore 20 formed in the base plate 2 to eventually assume a pressing position indicated by one-dot chain line in FIG. 2, whereupon the contactors 19 are pressed against their corresponding memory terminals 202 (FIG. 1). These memory terminals 202 exposed from the top face of the card are connected to an IC memory 201 built in the card. The connector 17 is connected to an information processing unit 100, hereinafter described.

Figure 3:
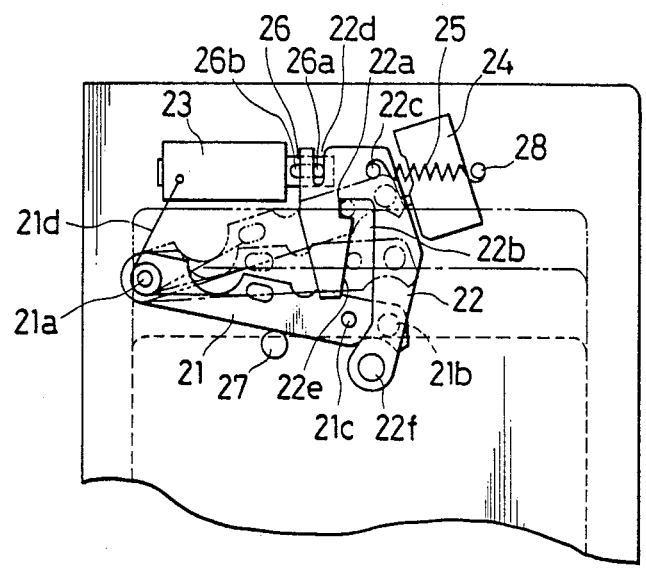
FIG. 3 is a schematic partial rear view showing a card insertion detection mechanism and its surrounding mechanisms of the main body of the apparatus.

As shown in FIG. 3, a lever 21 is locked about a pin 21a which is pivotably planted in the base plate 1. The lever 21 is permanently biased in the clockwise direction, as viewed in FIG. 3, by a spring 21d, and normally rests on a stopper 27. Pins 21b and 21c are planted in the lever 21, the former 21b penetrating a slit (not shown) bored in the base plate 1 to reach the card passage 3. The pin 21c, which extends in the opposite direction from the pin 21b, is arranged to be engageable with a recess or engaging portion 22a of a latch lever 22, hereinafter described. A pin 22f is planted in a raised portion 28 of the base plate 1, and the latch lever 22 is pivotably borne by the pin 22f. The latch lever 22 is shaped such that is has a passage 22b for the pin 21c of the lever 21 to enter and the recess 22a at the inner end of the passage 22b which can capture the pin 21c. The latch lever 22 is permanently biased clockwise, as viewed in FIG. 3, by a spring 25 stretched between a pin 22c planted in the latch lever 22 and a pin 128 planted in the base plate 1.

A pin 26a is provided such that it penetrates through a slit 26b, formed in the movable portion 26 of a solenoid 23, and through a recess 22d, formed in the latch lever 22 and extending roughly perpendicular to the slit 26b; the pin 26a is adapted to slide along the slit 26b as well as along the recess 22d. The lever 22, thus shaped, normally assumes a position which it is assuming in FIG. 3.

Reference numeral 24 designates a microswitch, which is turned on when its movable pin is depressed by the free end of the lever 21, which occurs when the lever 21 assumes the position indicated by two-dot chain line after it has swund anticlockwise, as viewed in FIG. 3, with its pin 21c entering deeper into the passage 22b and eventually arriving in the recess 22a of the latch lever 22.

Figure 4:
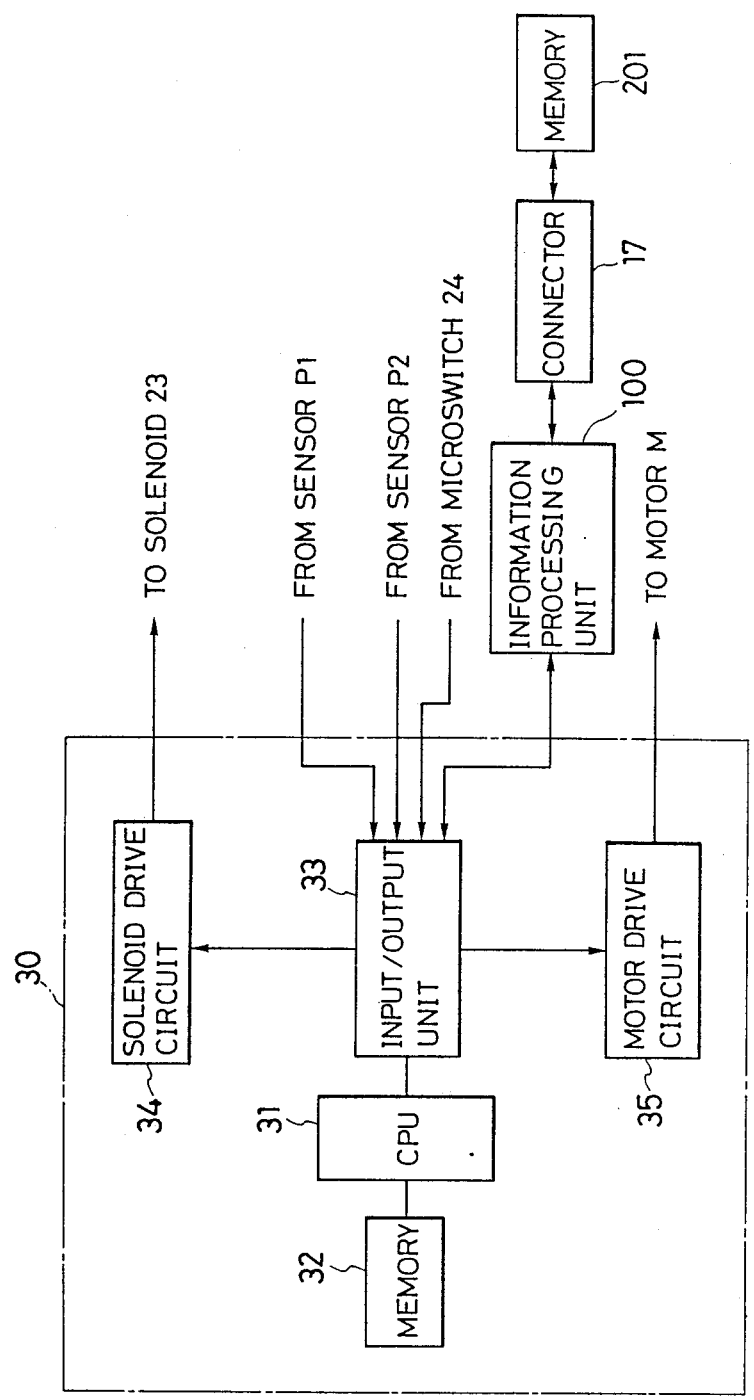
FIG. 4 is a schematic block diagram illustrating the circuit of control center of the read/write apparatus which is used together with the main body of FIG. 1.

FIG. 4 shows the internal arrangement of a control body 30, which together with the main body of the apparatus constitutes the read/write apparatus of the embodiment, wherein the reference numeral 31 corresponds to a microcomputer (hereinafter referred to as the CPU), and 32 to a memory that stores a program for controlling the read/write apparatus and also stores other data temporarily. The memory 32 consists of a ROM, a RAM, etc. Reference numeral 33 corresponds to an input/output circuit, which is connected to: a solenoid drive circuit 34 to drive the solenoid 23; the sensors P1, P2; the microswitch 24; a motor drive circuit 35 to controllingly drive the motor M; and an information processing unit 100. The unit 100 comprises a computer for data processing such as reading information from the memory of a card and writing same on a card. More particularly, when the contactors 19 of the connector 17 are pressed on the memory terminals 202 of the card 200, the information processing unit 100 is adapted to give information to and receive same from the memory 201. The information processing unit 100 of the present embodiment is constituted by an external information processing unit installed in the overall system in which the read/write apparatus is equipped. The contactors 19 of the connector 17 are adpated to be connected to the external information processing apparatus. As an alternative arrangement, the information processing unit may be built in the read/write apparatus and connected to the connector 17. In either arrangement, it is possible to modify the arrangement such that the connector 17 coupled to the information processing unit is connected to the CPU 31 via the input/output circuit 33, so that the information transmission is carried out between the memory 201 and the information processing unit by way of the CPU 31.

Figure 5:
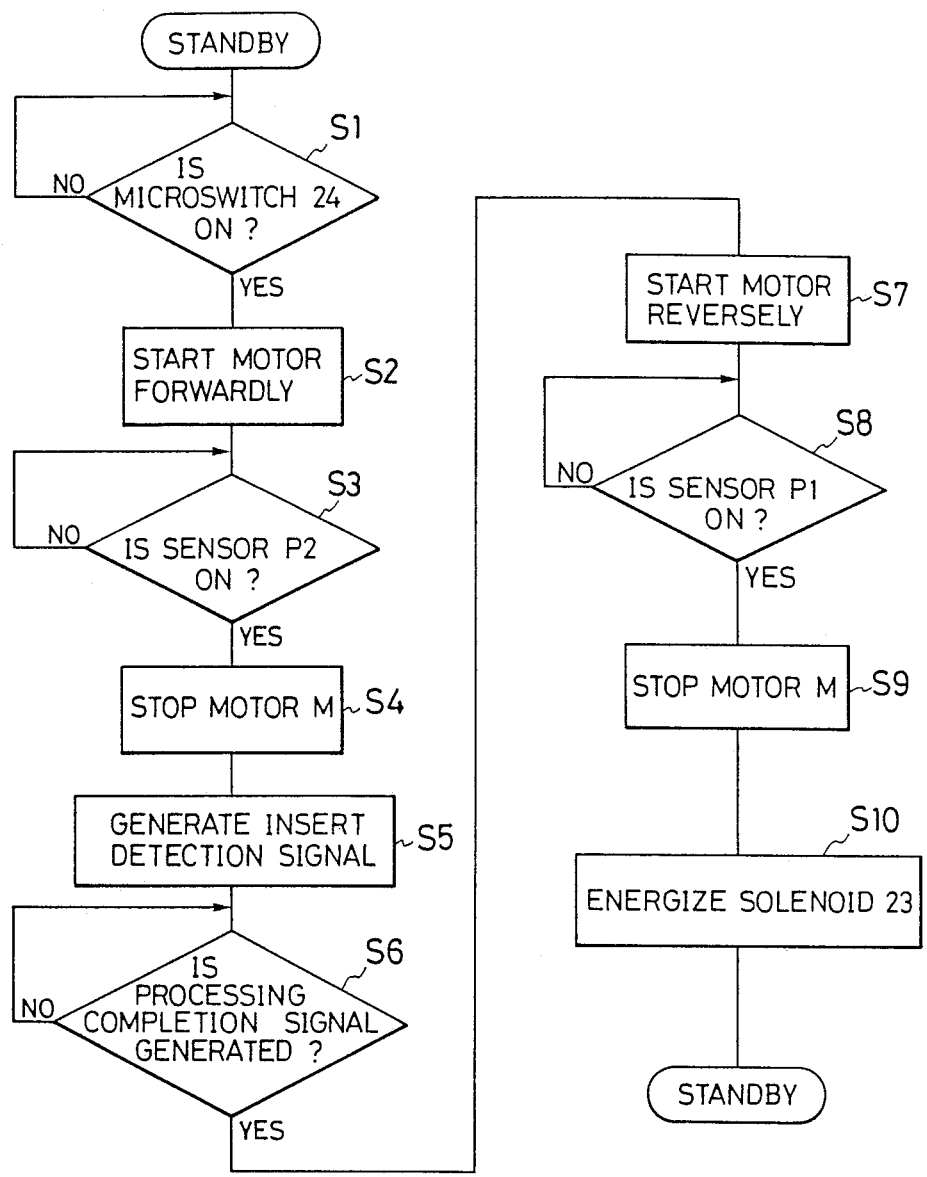
FIG. 5 shows a flowchart of the control program executed by the microcomputer shown in FIG. 4.

Next, the operation of the read/write apparatus of the first embodiment will be explained with reference to FIG. 5.

As a card is pushed by hand into the card insertion slit 4, the card slides along the card passage 3 and eventually the front edge of the card comes to touch the pin 21b planted in the free end of the lever 21. As the card is inserted deeper, the pin 21b is pushed by the card to trace a slit passage (not shown) formed in the base plate 1. As a result, the lever 21 turns anticlockwise about the pin 21a, whereby the pin 21c goes along the passage 22b, pressing and sliding on an inner edge 22e of the latch lever 22 to thereby cause the lever 22 to rotate about the pin 22f, overcoming the force of the spring 25. When the card is inserted into the read/write apparatus to a predetermined depth, the pin 21c clicks with the recess 22a to thereby lock the lever 21. Consequently, the card is stopped when it reaches the position indicated by two-dot line in FIG. 3, namely a fully inserted position. On this occasion, the free end of the lever 21 depresses the movable pin of the microswitch 24 to thereby turn the microswitch 24 on, whereby it is detected that the insertion of the card has been completed.

Detecting that the microswitch 24 has been turned on (step S1), the CPU 31 works the input/output cirucit 33 and the motor drive circuit 35 such that the motor M starts rotating in the forward or normal direction (step S2). As the motor M thus rotates, the shaft 9, receiving the motor torque via the gears 10 and 11, starts rotating together with the pin cam 15 and sensor means 13. As the pin cam 15 rotates, the pin 15a planted therein slides along the slit 16a while causing the connector lever 16 to swing clockwise, as viewed in FIG. 2.

The sensor means 13 is oriented such that the wing 13b comes to a predetermined position where it causes the sensor P2 to turn on when the pin 15a has travelled to the position shown by one-dot line in FIG. 2, that is, when the connector lever 16 has swung to assume the position indicated by one-dot line to thereby bring the connector 17 to the position in one-dot line, whereupon the contactors 19 of the connector 17 are pressed on the respective memory terminals 202 of the card 200. When the CPU 31 detects that the sensor P2 has turned on (step S3), it causes M to stop (step S4), and also transmits a signal indicating completion of card insertion to the information processing unit 100 (step S5). Then, the CPU 31 continually examines whether it has received a signal from the information processing unit 100 indicating that the processing has been completed (step S6). Meanwhile the information processing unit 100 reads out data from the memory 201 built in the card 200 by means of the contactors 19 of the connector 17, and, if necessary, the information processing unit 100 writes data on the memory 201.

When the information processing has been completed, the information processing unit 100 supplies the CPU 31 with the signal indicating completion of the processing. Detecting that the processing completion signal has been generated (step S6), the CPU 31 causes the motor M to rotate reversely (step S7), to thereby get the connector 17 removed from the card 200.

In synchronism with the reverse rotation of the motor M, the sensor means 13 rotates and when the wing 13a rotates to a predetermined position, the sensor P1 turns on. When the CPU 31 detects that the sensor P1 has been turned on (step S8), the CPU 31 causes the motor M to stop (step S9), and the solenoid drive circuit 34 to drive the solenoid 23 (step S10). As the solenoid 23 is thus driven, the movable portion 26 recedes to thereby pull the lever 22 anticlockwise around the pin 22f by virtue of the pin 26a. As a result, the pin 21c of the lever 21 is released from the recess 22a of the latch lever 22, whereupon the lever 21 swings clockwise flipped by the spring 21d and returns to its normal position shown by solid line in FIG. 3, while sending the card to stick out from the insertion slit 4. Thus, the apparatus returns to its card acceptable state (STAND BY).

The apparatus of the present embodiment operates as stated above, and therefore whenever the card 200 is on the move, the connector 17 is removed from the card 200, so that the contactor 19 of the connector 17 is kept from touching the memory terminal 202 of the card 200, and thus the card 200 as well as the contactor 19 can enjoy longer life.

Figure 6:
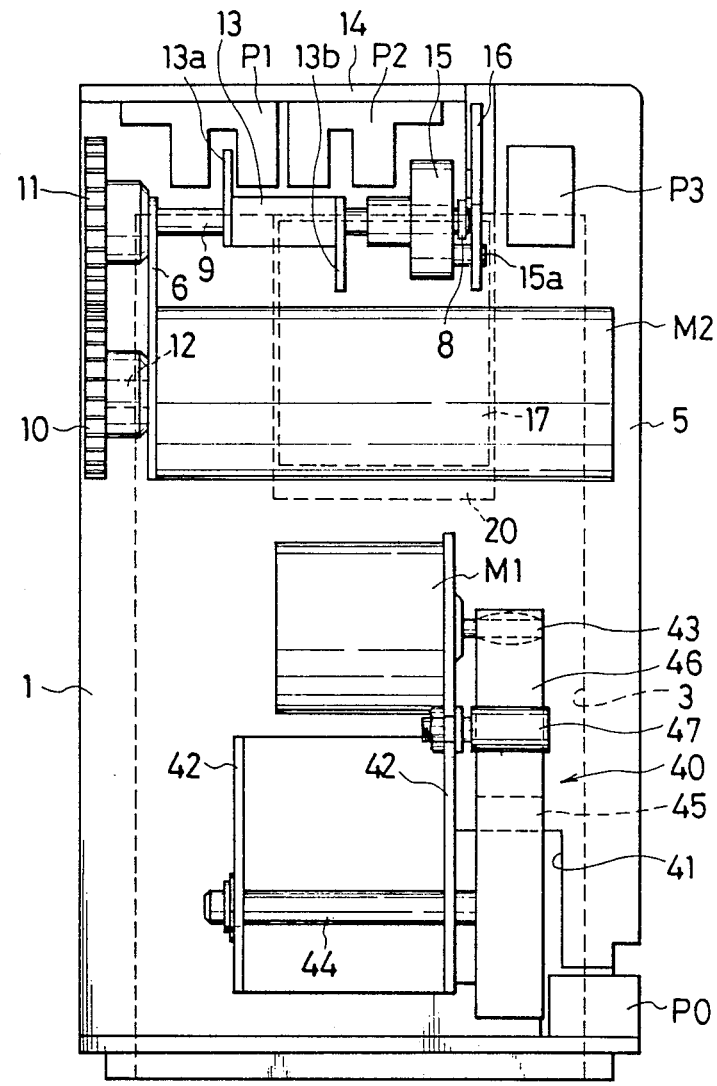
FIG. 6. is a schematic rear view of the main body of the read/write apparatus according to the second embodiment of the invention.
Figure 7:
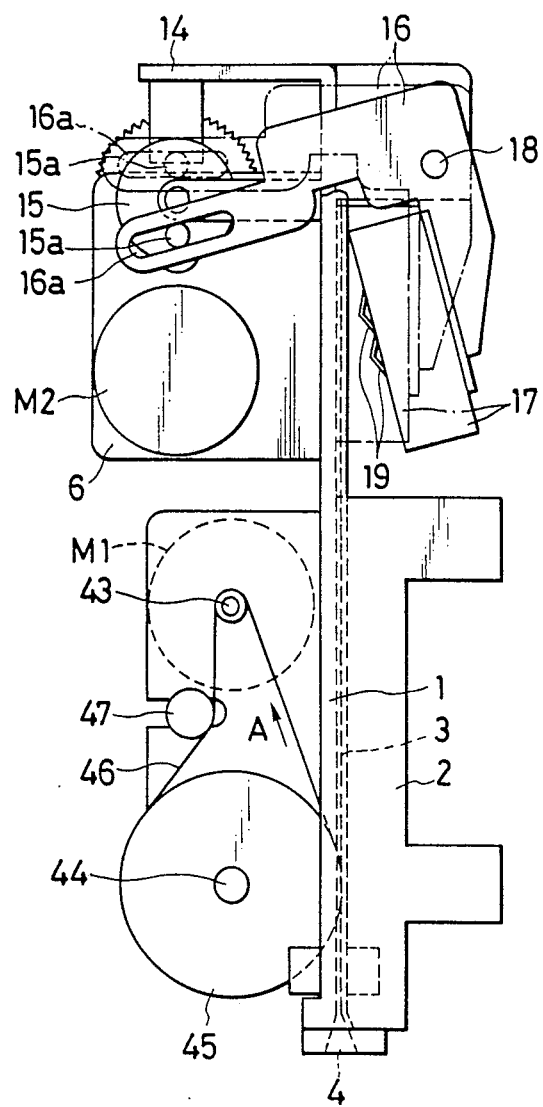
FIG. 7 is a schematic side view of the main body of the apparatus shown in FIG. 6.
Figure 8:
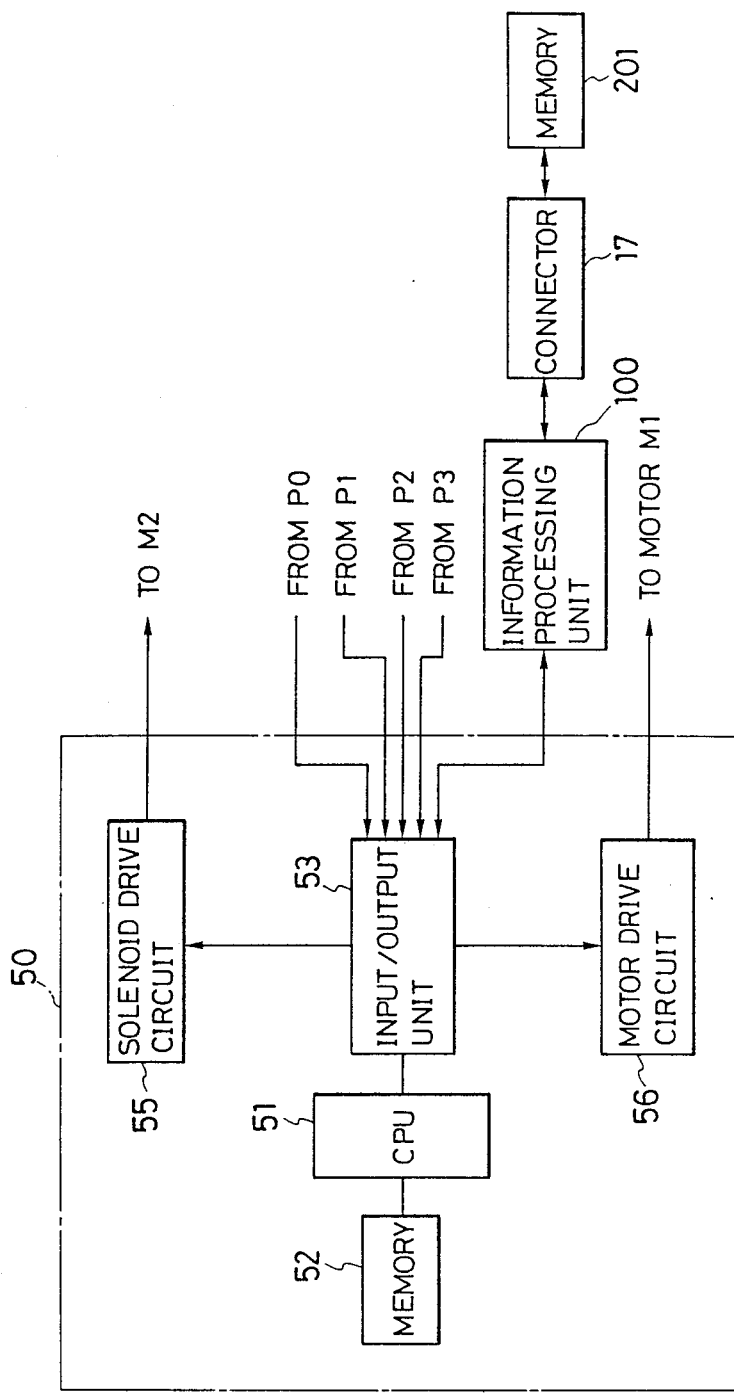
FIG. 8 is a schematic block diagram illustrating the circuit in the control center of the read/write apparatus which is used together with the main body shown in FIG. 6.

FIGS. 6 through 8 show the main body of the read/write apparatus according to a second embodiment of the invention.

This embodiment differs from the first in that the card is inserted automatically. More particularly, the read/write apparatus of the second embodiment is equipped with a card insertion and conveyance mechanism 40, a card insertion detective sensor P0, and a card insertion completion detective sensor P3, but is devoid of the card lock mechanism (FIG. 3) of the first embodiment consisting of the lever 21, latch lever 22, solenoid 23, microswitch 24, etc.

In the following explanation of the second embodiment, those elements that are of the same make as their counterparts in the first embodiment are designated by the same numerals and the explanation thereof is omitted.

A plate 42 is attached vertically to the base plate 1 to hold a motor M for inserting and conveying a card and to support a pulley shaft 44 rotatively. A pulley 45 is locked on the pulley shaft 44, and a belt 46 is passed around the output shaft 43 of the motor M and the pulley 45. The pulley 45 is placed such that the belt 46, as it is carried on the pulley 45, passes a bore 41 formed in the base plate 1 and, therefore, exposes itself into the card passage 3. A roller 47 is provided to adjust the belt tension. Provided in the vicinity of the card insertion slit 4 is a photosensor (a photocell, for example) P0 for detecting insertion of a card. A similar photosensor P3 is provided at the terminal of the card passage 3, to detect completion of card insertion, or more particularly whether the card has been entirely pulled inside and read/write apparatus.

A motor M2, like the motor M in the first embodiment, is a motor for driving a connector. The other constituents of the apparatus of the second embodiment are roughly the same as those appearing in the apparatus of the first embodiment, so that their explanation is omitted here.

FIG. 8 shows a control center 50 of the second embodiment, wherein a CPU 1, memory 52, and input/output circuit 53 are of the same kinds as those 31, 32, 33 in the first embodiment. Connected to the input/output circuit 53 are: sensors P0, P1 P2, and P3; motor drive circuits 55 and 56 to controllingly drive motors M1 and M2, respectively; and an external information (or data) processing unit 100.

Next, referring to FIG. 9, the operation of the second embodiment will be described.

When a front edge of a card is inserted in the card insertion slit 4, the sensor P0 senses the arrival of the card, whereupon the CPU 51 detects generation of a detection signal from the sensor P0 (step S21), and causes the input/output circuit 53 and the motor drive circuit 55 to energize the motor M1 such that it rotates in the normal direction to convey the belt 46 in the direction shown by the arrow A (FIG. 7) to thereby convey the card inwardly (step S22). The card, being caught between the belt 46 and the guiding face of the base plate 2, is conveyed along the card passage 3 as the belt 46 runs. When the card is entirely brought inside the card passage 3, the sensor P3 senses the front edge of the card, and the CPU 51 detects generation of a signal by the sensor P3 indicating that the conveyance of the card has been completed (step S23), and thereupon the CPU 51 causes the motor M1 to stop (step S24) while having the input/output circuit 53 and the motor drive circuit 56 energize the motor M2 such that the motor M2 rotates in the normal direction to drive the connector (step S25). As the motor M2 rotates thus, the shaft 9, receiving the motor torque via the gears 10 and 11, starts turning to thereby revolve the sensor means 13 and the pin cam 15. As a result, the connector lever 16, by virtue of the slidable engagement between its slit 16a and the pin 15a of the pin cam 15, is caused to rotate clockwise about the pin 18, whereupon the contactors 19 on the connector 17 attached to the connector lever 16 are pressed on the memory terminals 202 of the card 200. When the shaft 9 has turned so far as to bring the wing 13b of the sensor means 13 close enough to the sensor P2 to be sensed thereby, the contactors 19 come to press themselves fully on the card terminals 202. The CPU 51, catching a detection signal generated by the sensor P2 (step S26), causes the motor M2 to stop (step S27), and transmits to the information processing unit 100 a signal indicative of completion of card insertion (step S28). Upon receipt of this signal, the information processing unit 100 reads out data from the memory 201 of the card via the connector 17 and, as the case may be, new data is written in the memory 200 by the unit via the connector 17 after processing the data. When data processing is completed, a signal indicative thereof is generated. The CPU 51, sensing this signal (step S29), energizes the motor M2 in manner that the motor M2 turns in the reverse direction (step S30), to thereby turn the connector lever 16 anticlockwise about the pin 18, whereupon the contactors 19 part from the memory terminals 202 as the connector takes itself off the card. Accompanying the reverse rotation of the shaft 9, the sensor means 13 turns until the wing 13a comes close enough to the sensor P1 to be sensed thereby. The CPU 51 catches the signal generated by the sensor P1 then (step S31), and de-energizes the motor M2 to stop turning reversely (step S32), and energizes the motor M1 to turn reversely (step S33), whereupon the belt 46 carries the card backwrad in the passage 3, the card sticking further out of the card insertion slit. As the card slides back, the CPU 51 detects that the sensor P3 is turned off (step S34) and that finally the sensor P0 too turns off (step S35), and when the latter step occurs, that is, when the card is entirely discharged from the apparatus, the CPU 51 stops the motor M1. Thus, the apparatus returns to its card acceptable state.

As explained above, according to this second embodiment like the first, when the card is on the move the connector 17 is removed from the card so that the contactors 19 of the connector 17 do not touch the memory terminals 202 of the card, so that the card is not scratched nor does it damage the contactors 19 as it slides in and out along the passage Now, it is possible to modify the apparatus of the second embodiment such that erroneous processing of the data caused by dust adhering to the memory terminal of an IC card is prevented. This modified version of the read/write apparatus for IC card is to be basically of the similar composition as the apparatus of the second embodiment. In order to conduct a dust removal operation, the control program to be stored in the memory 52 (FIG. 8) of the read/write apparatus will be like that shown in FIG. 10a and 10b, in place of that in FIG. 9. The other constituents of this modified version will not be explained, as they are similar to those already explained.

Figure 10A:
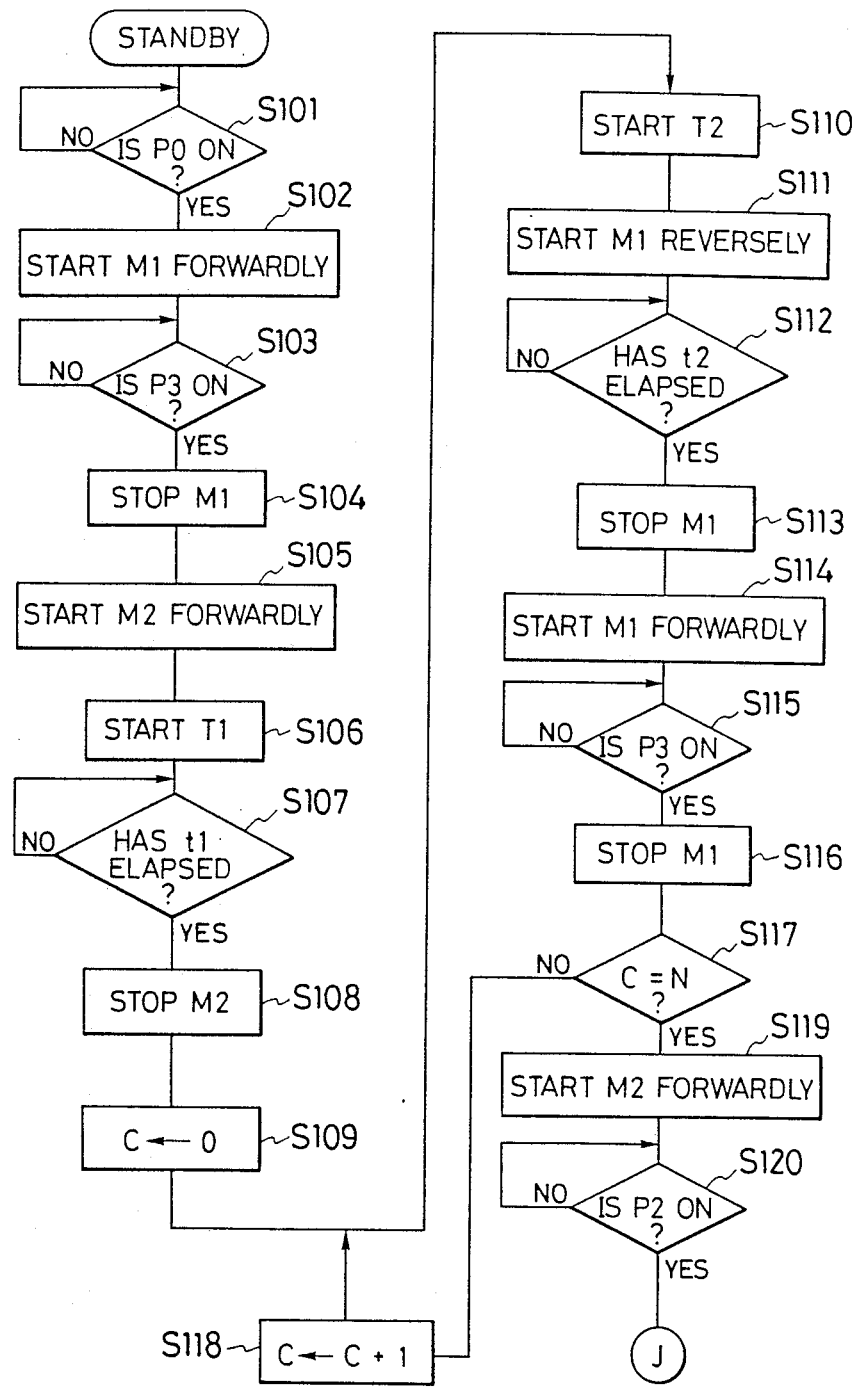
FIGS. 10a and 10b are flowchart of the control program to be used for the modified version of the apparatus of the second embodiment.
Figure 10B:
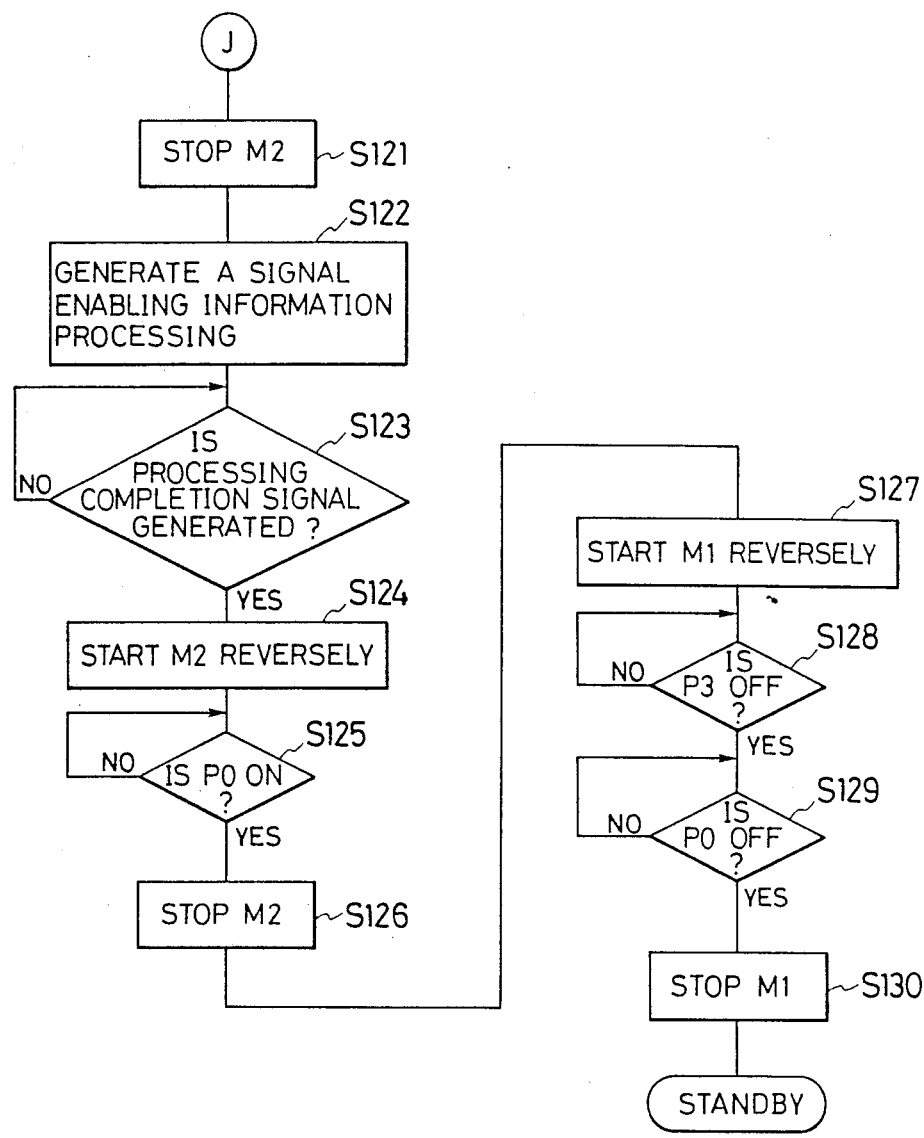

Referring to FIGS. 10a and 10b, the operation of the apparatus of the modified version will be explained.

Figure 9:
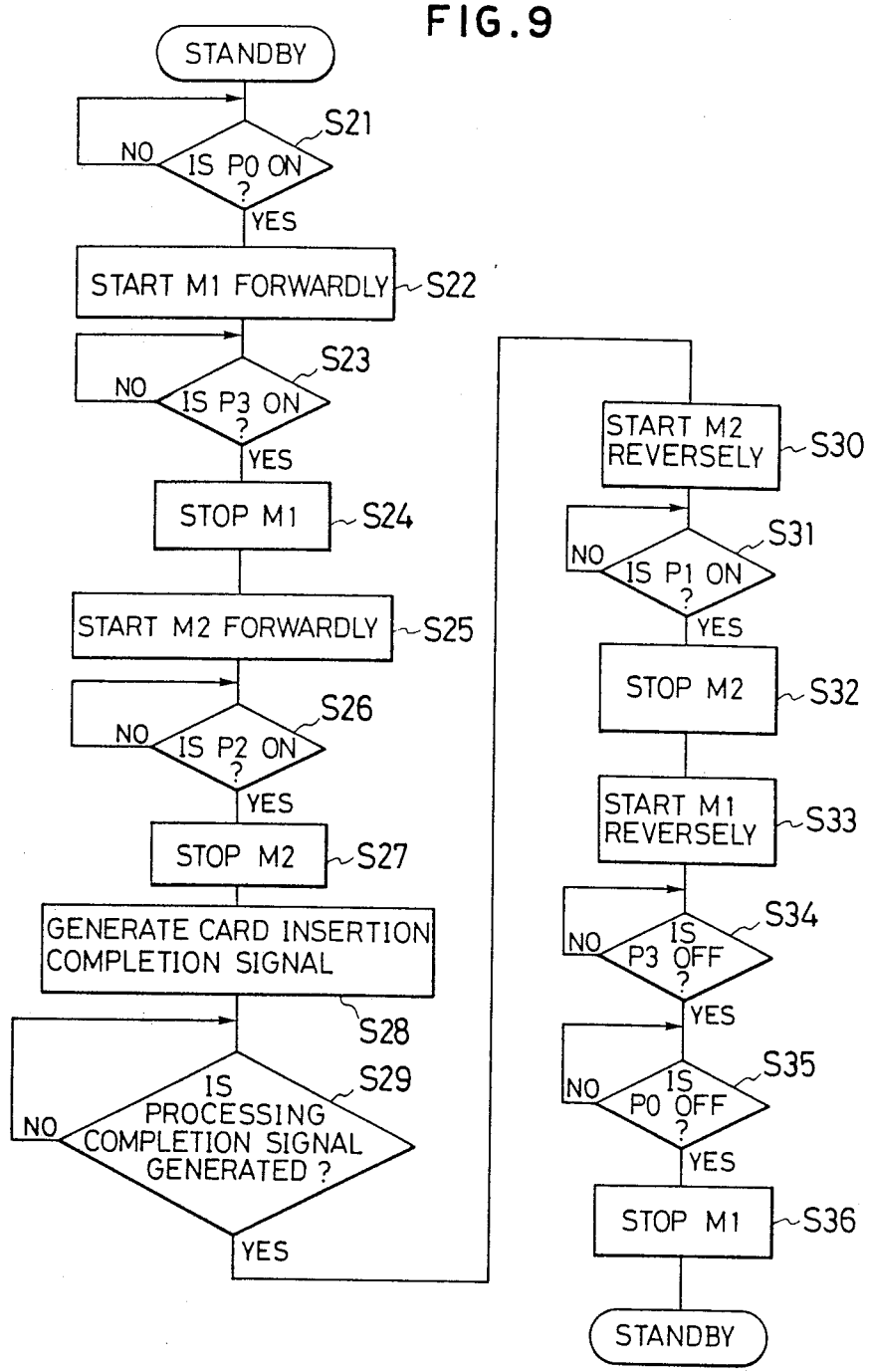
FIG. 9 is a flowchart of the control program executed by the microcomputer shown in FIG. 8.

As an IC card is inserted, the CPU 51 executes steps S101 through S105, which respectively correspond to steps S21 through S25 shown in FIG. 9. Then, as the IC card is conveyed along the card passage 3 as far as the conveyance completion position, the connector 17 is driven to approach the card. Next, the CPU 51 causes a timer T1, e.g., a software timer, to start counting, and until the timer T1 has counted up a predetermined time t1 the motor M2 is kept turning in the normal direction. When the timer T1 has counted the predetermined time t1, the motor M2 is turned off to stop (step S106–S108). The predetermined time t1 is of such length that when it has passed the motor M2 has turned sufficiently to bring the connector 17 to such a position where the contactors 19 are barely pressed on the memory terminals of the card. Incidentally, in place of the timer T1, another wing may be provided to the sensor means 13 orienting in such a direction that when it passses by and sensed by a sensor provided similarly as the sensors P1 and P2, the contactors 19 are barely pressing on the memory terminals 202, whereupon the motor M2 is stopped.

As the contactors 19 of the connector 17 come to lightly press themselves on the memory terminals 202, the CPU 51 resets a counter CR to read 0 (step S109), and timer T2 is started to count (step S110), and at the same time the motor M1 for insertion and conveyance of card is started to rotate reversely, whereupon the card is conveyed towards the card insertion slit 4 (step S111). Meanwhile the CPU 51 continually examines whether or not the timer T2 has counted up a time t2 (step S112), and when the time t2 has passed since the start of reverse rotation of the motor M1, the rotation of the motor M1 is stopped and then reversed (i.e. the motor M1 is switched to turn in the normal direction) to thereby convey the card inwardly (steps S113 and S114). Then, when the sensor P3 senses the front edge of the card (step S115), the motor M1 is stopped rotating in the normal direction (step S116), and it is determined whether or not the reading C of the counter CR is equal to a predetermined number N, that is, it is determined whether or not the card has been reciprocated N times (step S117). If the reading C has not reached N, the counter CR increases its count by one (step S118), and the program returns to step S110. Consequently, the card is reciprocated N times along the passage 3 with dust on the terminals being wiped away by the contactors 19. The time t2 for the timer T2 is set to be equal to the time that passes as the contactors 19 wipes the respective terminals 202 from one end to the other.

Thus the memory terminals 202 have their exposed faces cleaned by the contactors 19, and when the reading C of the counter CR reaches N (step S117), the motor M2 for driving the connector is caused to rotate in the normal direction (step S119); then as the wing 13b of the sensor means 13 is sensed by the sensor P2, the motor M2 is caused to stop (steps S120 and S121). As a result, the contactors 19 are firmly pressed against the memory terminals 202, whereby sound electrical connection is established. Then, the CPU 51 supplies the information processing unit 100 with a signal which enables information processing on the part of the information processing unit 100 (step S122).

The information processing unit 100, upon receipt of said signal, starts processing data, and, upon completion of the data processing, generates a signal indicative thereof. Detecting this signal indicative of completion of data processing (step S123), the CPU 51 executes steps S124 through S130, which respectively coresspond to steps S30 through S36 shown in FIG. 9.

Incidentally, in the above modified version of the second embodiment, the card is reciprocated for a number of times with the contactors lightly resting on the memory terminals to thereby clean the memory terminals, and thereafter the contactors are firmly pressed on the memory terminals to thereby establish a firm electrical connection between the contactors and the respective terminals; but instead of this arrangement the card may be reciprocated for a number of times with the contactors pressed firmly on the memory terminals all the time. It should be remarked, however, that to obtain better electrical connection between the contactors and terminals and to minimize the harm on the contactors, the arrangement wherein the contactors are reciprocated with contactors lightly resting on the memory terminals is more advisable.

In the first and second embodiments, the control center comprises a microcomputer, but instead thereof the control center may comprise a special control circuit.

FIG. 11 shows a kind of control center 30' which is installed in a read/write apparatus according to the above modification of the first embodiment. In FIG. 11, reference numerals G1,G2 designate AND gates; 11, 12 inverters; and 61 a motor drive circuit which governs driving of a motor M. Reference numeral 60 designates a flip-flop circuit which is set upon generation by the information processing unit of a processing completion signal, and is reset upon falling of the output of the AND gate G2. The reference numeral 62 refers to a one-shot multivibrator which is triggered upon falling of the output of the AND gate G1 to generate and supply a pulse as a card insertion completion signal to the information processing unit. Reference numeral 63 refers to a solenoid drive circuit which is triggered by a signal indicative of falling of the output from the AND gate G1 and drives the solenoid 23 for a predetermined length of time.

Next, the operation of the read/write apparatus of the above construction will be described.

As of the time when the card is inserted and the microswitch 24 is thus turned on, the sensor P2 has not yet generated the detection signal indicative that the connector 17 is pressing the contactors 19 on the card. Therefore, when the switch 24 is turned on, the AND gate G1 generates an output which causes the motor drive circuit 61 to drive the motor M1 in the normal direction. Then, as the contactors 19 of the connector 17 are pressed on the memory terminals 202 of the card and thus the sensor P2 is turned on, the AND gate G1 ceases to generate its output. Upon the cessation of the output from the AND gate G1, the one-shot multivibrator 62 generates a pulse which causes the information processing unit to start processing the information and the motor M to stop turning in the normal direction. Then, when the information processing unit supplies the flip-flop 60 with a signal indicative of completion of data processing, the flip-flop 60 is set to thereby generate a set output, in response to which the AND gate G2 generates an output (the sensor P1 is off at this time). The motor drive circuit 61, responsive to the output from the AND gate G2, causes the motor M to start rotating in the reverse direction. After this, as the sensor means 13 turns through such an angle that the wing 13a comes to be sensed by the sensor P1, the AND gate G2 ceases to generate the output. When this falling of the output from the AND gate G2 occurs, the flip-flop 60 is reset, and at the same time the solenoid drive circuit 63 is caused to drive the solenoid 23. The the motor M stops turning reversely, and due to the operation of the solenoid 23 the card springs backward to stick out from the card insertion slit 4, whereupon the apparatus assumes the card acceptable state (STAND BY).

Figure 12:
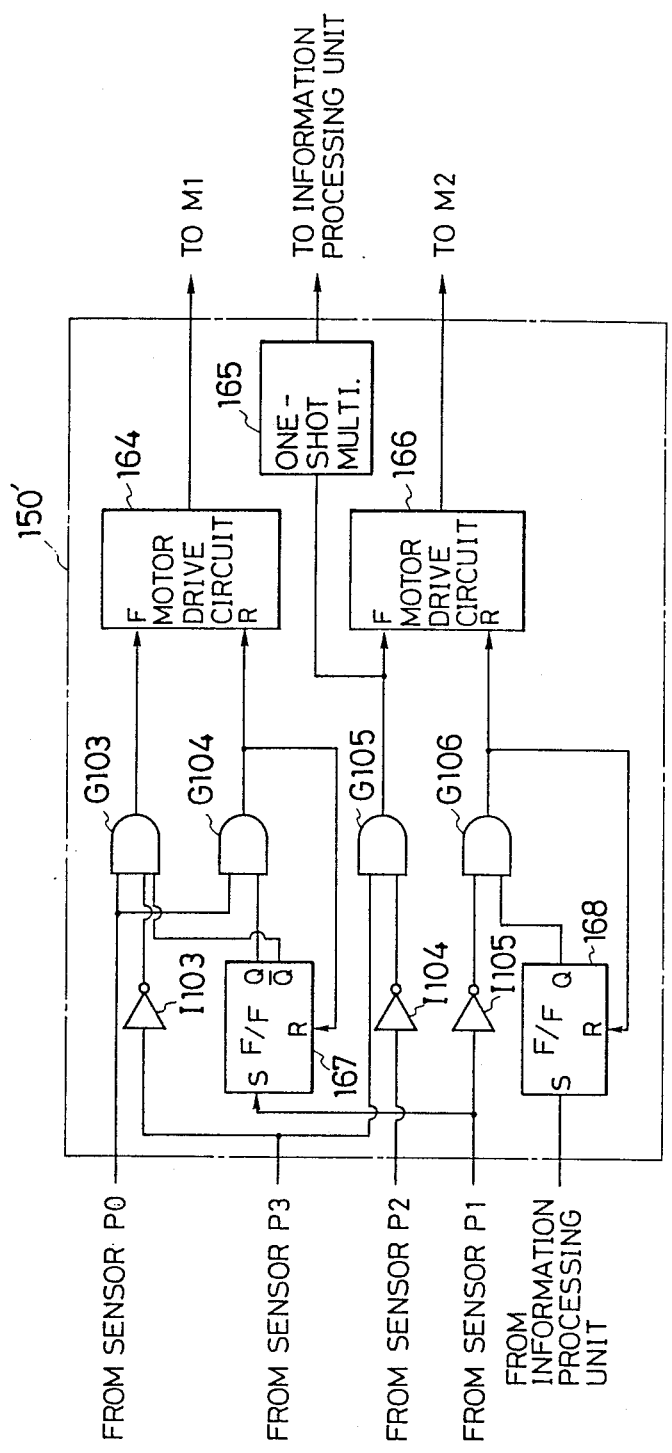
FIG. 12 is a diagram similar to FIG. 11, in the case of the modified version of the second embodiment.

FIG. 12 shows a control center 150' which is installed in a read/write apparatus of a similar modified version of the second embodiment. In FIG. 12 reference numerals G103–G106 refer to AND gates; I103–I105 to inverters; 164 to a motor drive circuit for the motor M1 to convey a card; 165 to a motor drive circuit for the motor M2 to drive the connector; 166 to a one-shot multivibrator which generates a pulse output triggered by a falling of the output from the AND gate G105; 167 and 168 to flip-flops which are set, respectively, by an output from the sensor P1 and a processing completion signal from the information processing unit 100 and are reset upon falling of the outputs from the AND gates G104 and G106, respectively.

When a card is inserted and the sensor P0 turns on, the AND gate G103 generates an output to thereby cause the motor M1 to rotate in the normal direction, thus the card is conveyed inwardly. Then, as the card arrives in the insertion completion position, the sensor P3, sensing the front edge of the card, turns on, whereupon the AND gate G103 ceases to generate the output, and thus the motor M1 stops turning in the normal direction and the AND gate G105 generates an output. The motor drive circuit 165, responsive to the output from the AND gate G105, causes the motor M2 to rotate in the normal direction to thereby press the contactors 19 of the connector 17 on the memory terminals 202 of the card. On this occasion, the sensor P2 turns on thereby let the AND gate G105 cease to generate the output,and this falling of the gate output triggers the one-shot multivibrator 166 to generate an output as the card insertion completion signal, which is received by the information processing unit. Upon completion of the information processing, the information processing unit generates the processing completion signal, which causes the flip-flop 168 to be set; then the AND gate G106 generates an output to cause the motor M2 to rotate reversely, to thereby bring the connector 17 away from the card. When the connector 17 has returned to its original position and thus the sensor P1 is turned on, the AND gate G106 ceases to generate the output,and this cessation causes the flip-flop 168 to be reset and the motor M2 to stop rotating in the reverse direction. Simultaneously as this, the flip-flop 167 is set and the AND gate G104 generates an output which causes the motor M1 to start rotating reversely to thereby send the card outside the apparatus. When the card is entirely discharged and thus the sensor P0 turns off, then the motor M1 stops turning reversely and the output of the AND gate G104 falls to thereby reset the flip-flop 167, whereupon the apparatus returns to the card acceptable state (STAND BY).

Figure 13:
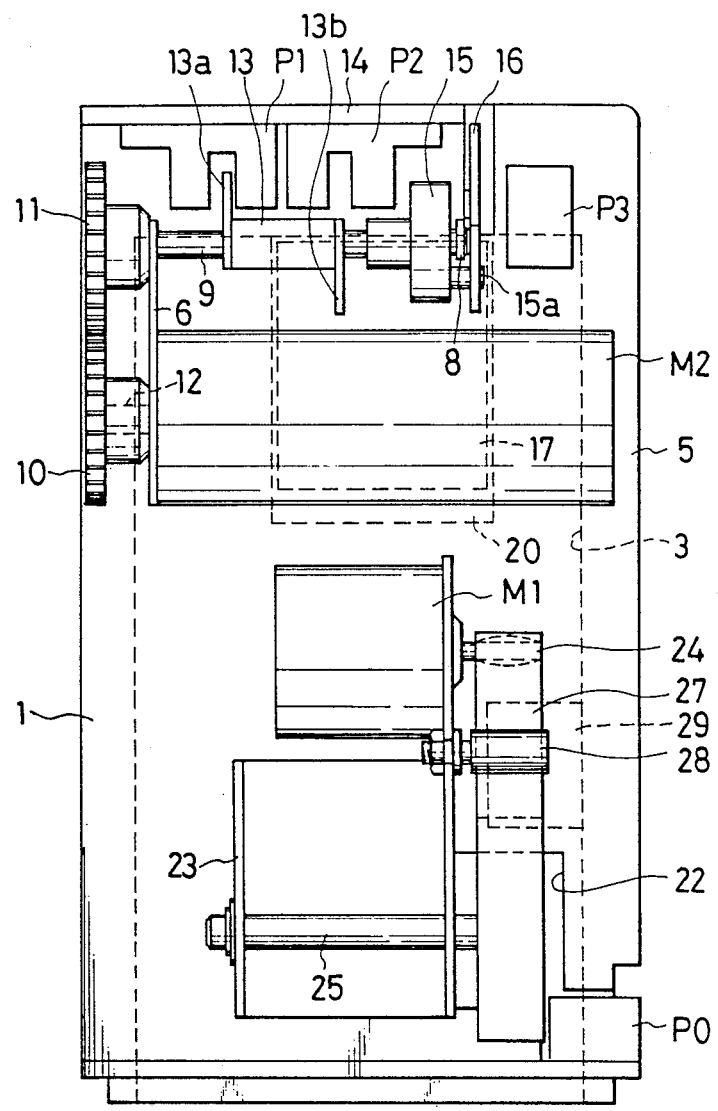
FIG. 13 is a schematic rear view of the main body of the read/write apparatus according to the third embodiment of the invention.
Figure 14:
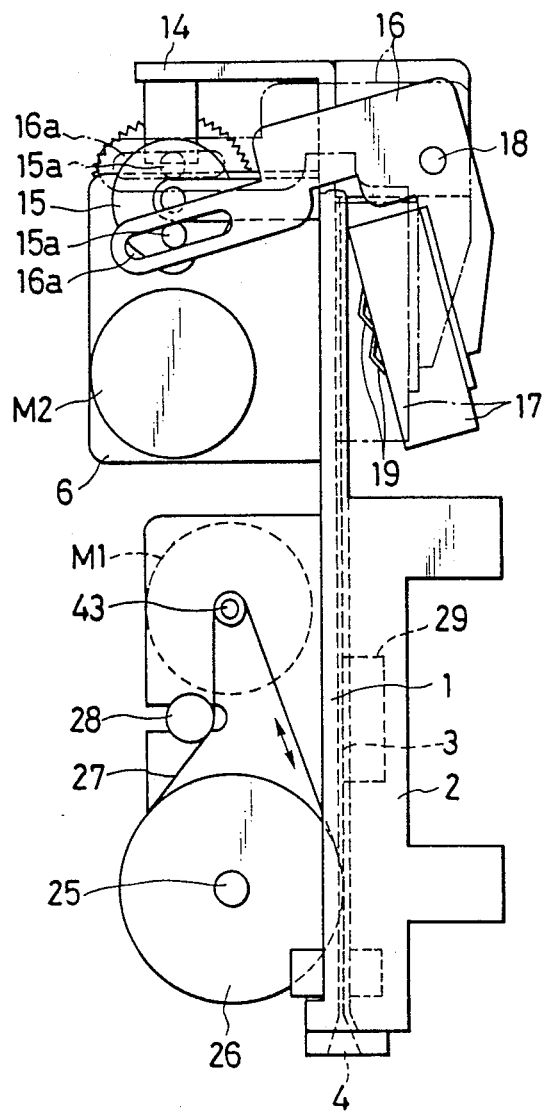
FIG. 14 is a schematic side view of the main body of the apparatus shown in FIG. 13.

FIGS. 13 and 14 show the main body of a read/write apparatus according to a third embodiment of the invention, and this main body is basically of the same construction as that of the second embodiment. Therefore, those elements which are common between the two embodiments are designated by the same numerals, and are not explained here. The control center of the apparatus is constructed as shown in FIG. 8.

The third embodiment apparatus differs from the second in that the former can accept both an IC card and a magnetic card. More particularly, the third embodiment apparatus has a magnetic head which faces the card passage 3 and is adapted to read out information from a magnetic stripe of the magnetic card and to write new information on the magnetic stripe. This reading and writing of information is carried out while the card is being conveyed. Like the second embodiment apparatus, the third embodiment apparatus operates in accordance with the control program shown in FIG. 9. The operation of the third embodiment apparatus will be explained, focusing the attention on its difference from the operation of the second embodiment apparatus.

When a card is inserted, steps S21 and S22 in FIG. 9 are executed, and the card is conveyed along the card passage 3. If the card is an IC card, the operation that follows will be the same as that explained with respect to the second embodiment, so that the explanation of the pursuing operating is not repeated here. If, on the other hand, the card is magnetic card, then, while the card is being conveyed (Step S22), the information stored in the magnetic stripe of the card is read by the information processing unit 100 by means of the magnetic head 29. When the card has arrived in the insertion completion position, the card is stopped (step S24). Next, the connector 17 is kept pressed on the card until the CPU 51 receives the processing completion signal from the information processing unit 100; then connector 17 is removed from the card and the card is conveyed outwardly (steps S25-S33). If need be, the information processing unit 100 writes information on the magnetic stripe of the card on the move by means of the magnetic head 29. When the card is entirely discharged, the apparatus returns to the card acceptable state (steps S35, S36).

As described above, the connector 17 is removed from the card passage 3, while the card is being conveyed inwardly or outwardly, so that the contactors 19 of the connector 17 are kept from contacting the card, wherefore no damage is done to the card nor to the contactors 19 themselves. Even if the magnetic stripe of the card is laid in such a position where the contactors can contact it, there is no possibility of the contactors' damaging the magnetic stripe.

As is clear from the above explanation, in the case of a magnetic card there is no need of executing the steps S25–S28 nor S30–S32, because information is read from or written on the magnetic card as the card is being conveyed inwardly and outwardly. In order to modify the third embodiment so as to skip those steps when they are unnecessary, a first judging step should be provided between the steps S22 and S23, at which an appropriate sensor is supposed to detect the kind of the card inserted and transmit a signal indicative thereof to the information processing unit, which should judge based on said signal whether the card is an IC card or a magnetic card. Then, if the card is judged to be a magnetic card, the information processing unit 100 should supply the CPU 51 with a signal indicative of insertion of a magnetic card. Further, a second judging step should be provided between the steps S24 and S25, at which the CPU 51 should judge whether or not it has received the signal indicative of insertion of the magnetic card. Should the result of the judgement, at the second judging step, be affirmative, then steps S25-S28 are skipped. Thus, the program should proceed to step S29 direct from step S24. Next, if, at step S29, it should be judged that the processing completion signal has been generated, then steps S30-S32 are skipped, and steps S33 et seq. are executed directly after step S29. If the card inserted is judged to be an IC card at the first judging step, then the program should proceed without skipping any steps in FIG. 9.

Figure 15:
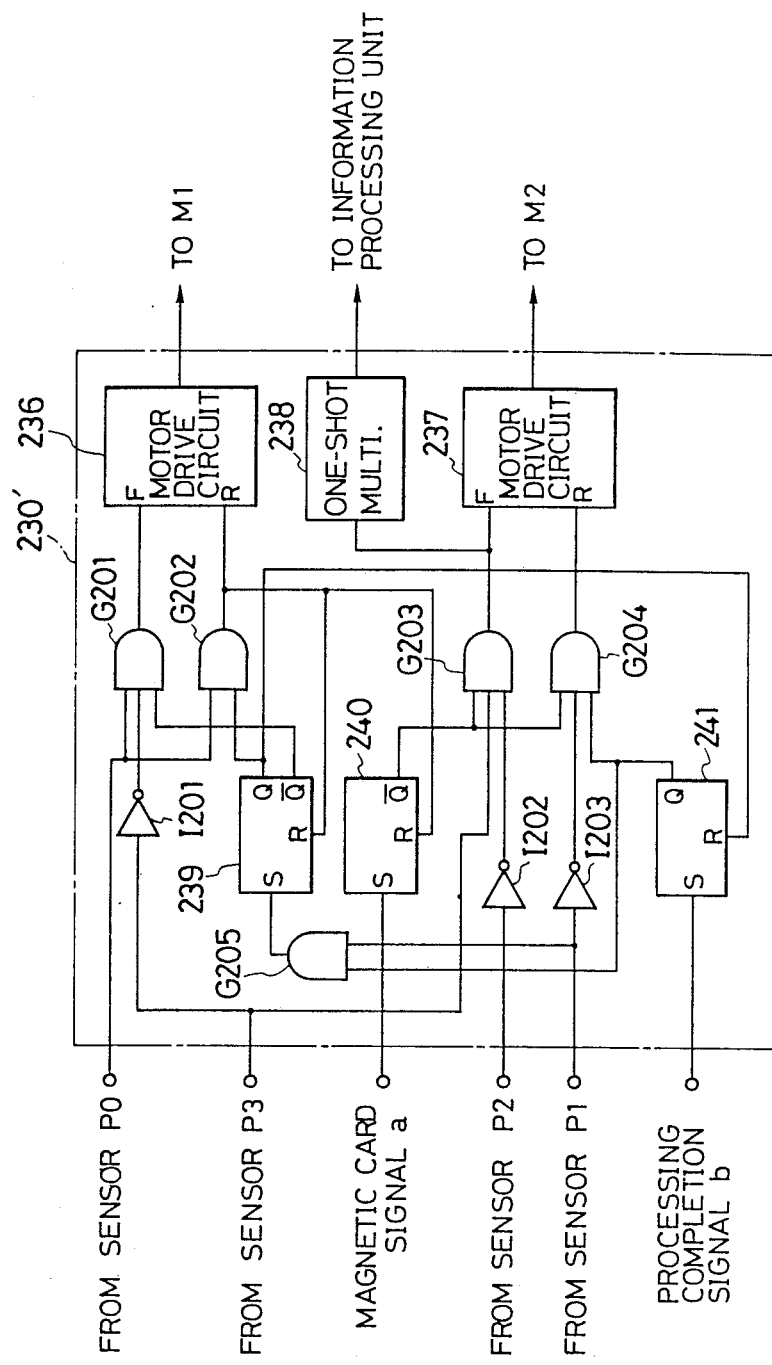
FIG. 15 is a schematic diagram illustrating the circuit in the control center which is used in the modified version of the apparatus of the third embodiment.

FIG. 15 shows the control center 230' adopted in the apparatus of the third embodiment, which 230' comprises a circuit used exclusively for controlling.

In FIG. 15, reference numerals G201-G205 refer to AND gates, I201-I203 to inverters, 236 to a motor drive circuit for the motor M1 to convey the card, 237 to a motor drive circuit for the motor M2 to drive the connector, 238 to a one-shot multivibrator which is triggered by the falling of the pulse generated by the AND gate G203, and 239-241 to flip-flops.

Now, the operation of the control center 230' is as follows: the flip-flops 239-241 as of the card acceptable state are all reset. Thus, as a card is inserted and the sensor P0 turns on, the AND gate G201 generates an output to cause the motor M1 to rotate in the normal direction to thereby convey the card inwardly. If the card is a magnetic card, it is possible to read the information (data) from the magnetic stripe by means of the magnetic head 29 while the card is on the move. If, on the other hand, the card is an IC card, then the information processing unit does not transmit a signal a indicative of insertion of a magnetic card so that the flip-flop 240 remains reset. When the front edge of the card reaches the position of the sensor P3, the sensor P3 turns on, and the AND gate G201 ceases to generate the output. As a result, the motor M1 stops turning normally and the AND gate G203 generates an output to cause the motor M2 to turn normally. Thereafter, as the contactors 19 of the connector 17 are pressed against the memory terminals 202 of the card, the sensor P2 turns on to thereby cause the AND gate G203 to stop generating the output. This falling of the AND gate output triggers the one-shot multivibrator 238, whereby a pulse as the card insertion completion signal is transmitted to the information processing unit. Then, the information processing unit starts processing the information, and when the processing is completed it generates the processing completion signal. This signal causes the flip-flop 241 to be set, which in turn causes the AND gate G204 to generate an output to thereby start the motor M2 in the reverse direction so that the connector 17 is removed from the card. Then, as the sensor P1 turns on, the AND gate G204 ceases to generate the output, whereupon the motor M2 stops turning reversely. At the same time, the turning on of the sensor P1 causes the AND gate G205 to generate a Q output to thereby set the flip-flop 239. The Q output from the flip-flop 239 causes the flip-flop 239. The output Q from the flip-flop 239 causes the flip-flop 241 to be reset, and at the same time the AND gate G202 generates an output to start the motor M1 in the reverse direction, whereby the card is carried outside. When the card is entirely carried out and thus the sensor P0 turns off, the motor M1 stops turning reversely and the AND gate G202 stops generating output, whereupon the flip-flops 239 and 240 are reset and the card-acceptable state returns.

Next, the operation in the case where the inserted card is a magnetic card will be explained. As a magnetic card is inserted, the information processing unit generates the magnetic card signal a, which causes the flip-flop 240 to be set, whereby the flip-flop 240 ceases to generate a reset output $\overline{Q}$, and eventually the AND gates G203 and G204 close. Since no output is generated by the AND gates G203 and G204, the motor M2 for driving the connector is not started. Then, when the information processing unit generates the processing completion signal b, the flip-flop 241 is set and the set output Q is applied to the AND gate G205. So long as this set output Q is applied, the sensor P1 keeps generating a H level output so that the H level output appears at the output terminal of the AND gate G205, whereby the flip-flop 239 is set. Being thus set, the flip-flop 239 generates the output Q, which causes the flip-flop 241 to be reset and the AND gate G202 to generate an output to start the motor M1 reversely, whereupon the card is conveyed outside the apparatus. When the sensor P0 turns off, the motor M1 stops rotating reversely and at the same time the AND gate G2 ceases to generate the output, whereupon the flip-flops 239, 240 and 241 are reset and the card acceptable state (STAND BY) returns.

What is claimed is:

1. A read/write apparatus for information memory card adatped to receive an IC card manually inserted in said apparatus, said IC card incorporating a memory whose terminals are at least partly exposed from an outer surface of the IC card, the improvement comprising:
   an insertion completion detection means for generating a detection signal when said IC card has been completely inserted in said read/write apparatus;
   a hold means operable to hold said IC card in an insertion completion position when said IC card has been completely inserted;
   a connector means arranged to be movable toward and away from the IC card,and having contactors adapted to be brought into contact with respective memory terminals of said inserted IC card;
   a connector drive means for driving said connector means toward and away from said IC card; and
   a control means for controlling said connector drive means and said hold means, said controlling means responsive to said detection signal from said insertion completion detection means to make said connector driving means drive said connector means so as to bring said contactors of said connector means in contact with respective terminals of said memory, and responsive to a particular signal to make said connector drive means drive said connector means so as to bring said contactors out of contact with respective terminals of said memory, and render said hold means inoperative.

2. A read/write apparatus as claimed in claim 1, further comprising;
   an information processing unit connected to said connector means and to said control means for performing information processing;
   wherein said information processing unit is operable to read information from and write information on said memory via said connector means, and supply said control means with a signal indicative of completion of information processing, as said particular signal, when the information processing is completed.

3. A read/write apparatus as claimed in claim 1, wherein said connector means and said control means are adapted for connection with an external information processing unit provided outside said read/write apparatus for performing/information processing, said external information processing unit being operable to read information from and write information on said memory via said connector means, and supply said control means with a signal indicative of completion of information processing, as said particular signal, when the information processing is completed.

4. A read/write apparatus for information memory card operable to automatically convey an IC card in and out of said apparatus, said IC card incorporating a memory whose terminals are at least partly exposed from an outer surface of the IC card, said apparatus having a card insertion slit and a card passage communicated with the card insertion slit, the improvement comprising:
   a card conveyance means for conveying said IC card, inserted through said card insertion slit, inwardly of said apparatus, and for conveying said IC card toward said card insertion slit;
   an insertion completion detection means for generating a detection signal when said IC card has been completely inserted in said apparatus by said card conveyance means;
   a connector means arranged to be movable toward and away from said IC card, and having contactors adapted to be brought into contact with respective memory terminals of said inserted IC card;
   a connector drive means for driving said connector means toward and away from said IC card; and
   a control means for controlling said connector drive means and said card detection signal from said insertion completion detection means to make said card conveyance means stop conveying said card and make said connector drive means drive said connector means so as to bring said contactors of said connector means in contact with respective terminals of said memory, and responsive to particular signal to make said connector drive means drive said connector means so as to bring said contactors out of contact with respective terminals of said memory, and make said card conveyance means convey said IC card outwardly of said apparatus.

5. A read/write apparatus as claimed in claim 4, further comprising:
   a connector position detection means for detecting a position of said connector means;
   wherein said connector position detection means is operable to supply said control means with a contact signal when said contactors of said connector means contact respective memory terminals of said IC card in a predetermined manner; said control means being responsive to said contact signal to make said connector drive means stop driving said connector means toward said IC card, and to thereafter make said card conveyance means reciprocate said IC card along said card passage for a predetermined number of times with said contactors kept contacting said memory terminals in said predetermined manner.

6. A read/write apparatus as claimed in claim 5, wherein said connector position detection means is adapted to generate said contact signal when said contactors of said connector means lightly contact with said memory terminals of said IC card, said control means being operable to make said connector drive means drive said connector means toward said IC card until said contactors are pressed on said memory terminals.

7. A read/write apparatus as claimed in claim 6, wherein said connector position detection means includes a timer for measuring a predetermined interval of time from when said connector drive means starts driving said connector means toward said IC card, and is operable to generate said contact signal when said timer has finished measuring said predetermined interval of time.

8. A read/write apparatus as claimed in claim 4, further comprising:
   a magnetic head disposed in a manner facing said card passage;
   wherein information stored in a magnetic stripe formed in said magnetic card is read out or another information is written on said magnetic stripe by means of said magnetic head, while a magnetic card is conveyed, whereby said read/write apparatus is rendered capable of accepting both said IC card and said magnetic card.

9. A read/write apparatus as claimed in claim 8, wherein said read/write apparatus is adapted to make a judgment of whether an inserted card is magnetic card or an IC card, said control means being operable to render said connector drive means inoperative when it is judged that a magnetic card is inserted.

10. A read/write apparatus as claimed in any one of claims 4 through 9, further comprising:
    an information precessing unit connected to said connector means and to said control means for performing information processing:
    wherein said information processing unit is operable to read information from and write information on said memory via said connector means, and supply said control means with a signal indicative of completion of information processing, as said particular signal, when the information processing is completed.

11. A read/write apparatus as claimed in any one of claims 4 through 9, wherein said connector means and said control means are adapted for connection with an external information processing unit provided outside said read/write apparatus for performing information processing, said external information processing unit being operable to read information from and write information on said memory via said connector means, and supply said control means with a signal indicative of completion of information processing, as said particular signal, when the information processing is completed.

* * * * *